United States Patent
Bright et al.

(10) Patent No.: US 7,621,773 B2
(45) Date of Patent: Nov. 24, 2009

(54) RECEPTACLE ASSEMBLY INCLUDING A LIGHT PIPE STRUCTURE

(75) Inventors: Edward John Bright, Middletown, PA (US); Harold William Kerlin, Port Royal, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 12/101,572

(22) Filed: Apr. 11, 2008

(65) Prior Publication Data

US 2009/0258534 A1  Oct. 15, 2009

(51) Int. Cl.
 *H01R 3/00* (2006.01)
(52) U.S. Cl. ...................................... 439/490
(58) Field of Classification Search ................ 439/485, 439/486, 487, 488, 489, 490; 361/719, 704, 361/715; 174/16.3; 257/718
See application file for complete search history.

(56) References Cited

U.S. PATENT DOCUMENTS

| | | | |
|---|---|---|---|
| 5,876,239 A * | 3/1999 | Morin et al. ................ 439/490 |
| 6,113,422 A * | 9/2000 | Somerville et al. .......... 439/490 |
| 7,121,898 B2 * | 10/2006 | Murr et al. .................. 439/676 |
| 7,175,327 B1 * | 2/2007 | Tsai ........................... 362/555 |
| 7,249,966 B2 * | 7/2007 | Long ....................... 439/541.5 |
| 7,355,857 B2 * | 4/2008 | Pirillis et al. ................ 361/715 |
| 2003/0161108 A1 * | 8/2003 | Bright et al. ................ 361/707 |
| 2005/0254772 A1 | 11/2005 | Long et al. |
| 2007/0253168 A1 | 11/2007 | Miller |

* cited by examiner

*Primary Examiner*—Chandrika Prasad

(57) ABSTRACT

A receptacle assembly that is coupled to a host system and configured to receive an electrical component is provided. The receptacle assembly includes a guideframe having a front end, a back end, and a passage that extends therebetween. The guideframe is configured to receive the electrical component and includes a rear panel that is proximate to the back end and a side panel that has a support member extending therefrom. The receptacle assembly also includes a light pipe structure that has a light pipe that extends alongside the guideframe from the front end to the back end. The light pipe includes a rearward end portion that is configured to receive a status indication from the host system. The light pipe structure is directly engaged to the support member and the rearward end portion is directly engaged to at least one of the side panel and the rear panel.

20 Claims, 7 Drawing Sheets

RECEPTACLE ASSEMBLY INCLUDING A LIGHT PIPE STRUCTURE

BACKGROUND OF THE INVENTION

The invention relates generally to electrical connector assemblies, and more particularly to receptacle assemblies that include a light pipe structure for indicating use of an electrical component.

Pluggable electrical components, such as transceiver modules, may be used for making bi-directional connections to communication devices such as modems, network interfaces, and other electronic modules or electrical systems such as computer systems and the like. The Small Form-Factor Pluggable (SFP) standard, which supports both fiber optic and copper based transceivers, includes specifications for transceivers that are reduced in size to achieve a higher port density. Typically, an SFP module is inserted into a complementary guideframe of a receptacle assembly that is mounted on a circuit board. The SFP module couples with an electrical connector within the guideframe for transmitting information. However, the ongoing trend toward higher performance systems that operate at higher signal speeds and higher port density has resulted in increased concerns for thermal management. Generally, the electronics commonly used to increase signal speeds also generate more heat. In at least some receptacle assemblies, a heat sink is used to absorb and dissipate heat from the SFP module.

In one known receptacle assembly, the receptacle assembly includes a guideframe for receiving a pluggable electrical component, a heat sink, and a bracket that is configured to hold the heat sink against the guideframe and/or the electrical component when the component is inserted into the receptacle assembly. The receptacle assembly is coupled to a circuit board of a host system and also includes a light pipe structure that is configured to convey light signals generated on the circuit board to a front end of the receptacle assembly. The light signals indicate the quality of transmission between the electrical component and the host system. In the known receptacle assembly, the light pipe structure is directly coupled to the bracket and/or heat sink. When the electrical component is inserted into the receptacle assembly, the component engages the heat sink causing the heat sink to move from its resting or home position. However, because the light pipe structure is directly coupled to the bracket, moving the heat sink causes the light pipe structure to move as well. As such, transmission of the light signals along the light pipe structure may be affected. Furthermore, if a heat sink is not used with the known receptacle assembly, the bracket is still utilized in order to hold the light pipe structure even though the bracket is not needed to hold the heat sink.

Thus, there is a need in the industry for a receptacle assembly that includes a light pipe structure that will remain substantially in the light pipe structure's home position when an electrical component is inserted into the receptacle assembly. Furthermore, there is a need in the industry for receptacle assemblies that may be formed with fewer parts and use fewer manufacturing steps.

BRIEF DESCRIPTION OF THE INVENTION

In one embodiment, a receptacle assembly that is coupled to a host system and configured to receive an electrical component is provided. The receptacle assembly includes a guideframe having a front end, a back end, and a passage that extends therebetween. The guideframe is configured to receive the electrical component and includes a rear panel that is proximate to the back end and a side panel that has a support member extending therefrom. The receptacle assembly also includes a light pipe structure that has a light pipe that extends alongside the guideframe from the front end to the back end. The light pipe includes a rearward end portion that is configured to receive a status indication from the host system. The light pipe structure is directly engaged to the support member and the rearward end portion is directly engaged to at least one of the side panel and the rear panel.

Optionally, the at least one of the side panel and the rear panel may include a hole and the light pipe structure may include a coupling member that has a protrusion. The protrusion may be configured to be inserted through the hole to directly engage the guideframe to the light pipe structure. Also, the light pipe structure may only be supported by the guideframe.

In another embodiment, a receptacle assembly that is coupled to a host system and configured to receive an electrical component is provided. The receptacle assembly includes a guideframe having a front end, a back end, and a passage that extends therebetween. The guideframe is configured to receive the electrical component and includes a rear panel that is proximate to the back end and a side panel that has a support member extending therefrom. The receptacle assembly also includes a heat sink that is coupled to the guideframe and is configured to absorb thermal energy generated within the guideframe. The receptacle assembly also includes a light pipe structure that has a light pipe that extends alongside the guideframe from the front end to the back end. The light pipe includes a rearward end portion that is configured to receive a status indication from the host system. The light pipe structure is directly engaged to the support member and the rearward end portion is directly engaged to at least one of the side panel and the rear panel.

Optionally, the guideframe may include a passage opening and the heat sink may include a bottom portion that is configured to extend into the passage through the passage opening. The bottom portion may be configured to engage the electrical component when the electrical component is inserted into the guideframe.

DETAILED DESCRIPTION OF THE INVENTION

Figure 1:
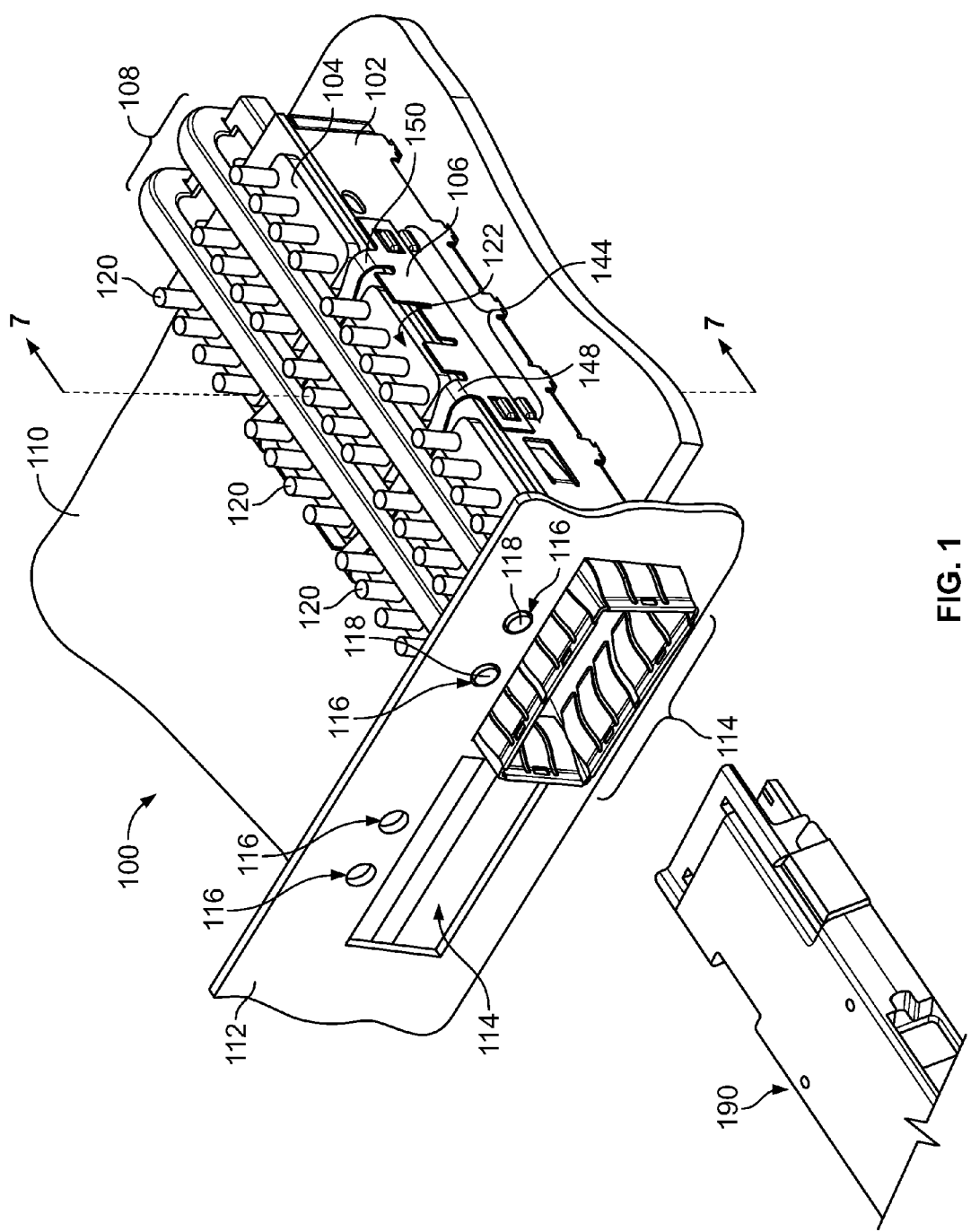
FIG. 1 is a perspective view of a receptacle assembly formed in accordance with one embodiment.

FIG. 1 is a perspective view of a receptacle assembly 100 formed in accordance with one embodiment. The receptacle assembly 100 is communicatively coupled to a host system (not shown) and may include a guideframe 102 and a light pipe structure 108 that extends a length L (shown in FIG. 2) of the guideframe 102. Optionally, as shown in FIG. 1, the receptacle assembly 100 may include a heat sink 104 and a bracket 106 that couples the heat sink 104 to the guideframe 102. The receptacle assembly 100 is configured to receive a pluggable electrical component 190 that may be, for example, a Small Form Factor Pluggable (SFP) transceiver module, an XFP transceiver module, a Quad Small Form-factor Pluggable (QSFP), or the like. Furthermore, it is to be understood that the benefits and advantages of embodiments of the receptacle assemblies described herein may accrue equally to other types of electrical assemblies across a variety of systems and standards. Also, although the receptacle assembly 100 is shown as being able to receive one electrical component, the receptacle assembly 100 may be configured to receive two or more pluggable electrical components. For example, the guideframe 102 may be configured to receive two or more electrical components that are laterally adjacent to each other (i.e., side-by-side) and/or two or more components that are stacked upon each other.

The light pipe structure 108 is configured to transmit a status indication from the host system. The status indication may relate to a quality of transmission between the host system and the electrical component 190. For example, the status indication may be a colored light (e.g., green for high quality transmission, red for poor transmission or to indicate a disconnection). The status indication may be a light that flashes or blinks at a predetermined frequency. Also, the status indication may light up one or more alpha-numeric characters or symbols that indicated the status of transmission. Alternatively, the status indication may relate to other information besides the quality of transmission that the host system desires to indicate through light signaling. As will be discussed in greater detail below, in some embodiments, the light pipe structure 108 may directly engage or may be directly supported by the guideframe 102. As used herein, the term "directly" means that the light pipe structure 108 is in physical contact with the guideframe 102. Furthermore, in some embodiments, the light pipe structure 108 is solely supported by the guideframe 102.

Also shown in FIG. 1, the host system includes a front panel or bezel 112 that includes a bezel opening 114 through which a portion of the guideframe 102 extends. Alternatively, the guideframe 102 may extend into a cap or into a rear portion of the bezel 112. The guideframe 102 may be electrically connected to the bezel 112. Furthermore, the bezel 112 may include one or more pipe openings 116 though which pipe end(s) 118 of the light pipe structure 108 may extend into or therethrough. As discussed above, the light pipe structure 108 may be solely supported by the guideframe 102. As used herein, the phrase "solely supported by the guideframe" may include some unintentional interaction or contact between the pipe end(s) and the corresponding pipe opening(s).

As shown, the pipe openings 116 may be positioned above the opening 114. In alternative embodiments, the pipe openings 116 may be positioned near a lateral side of the opening 114, or the pipe openings 116 may be configured to completely surround or partially surround the opening 114.

Figure 2:
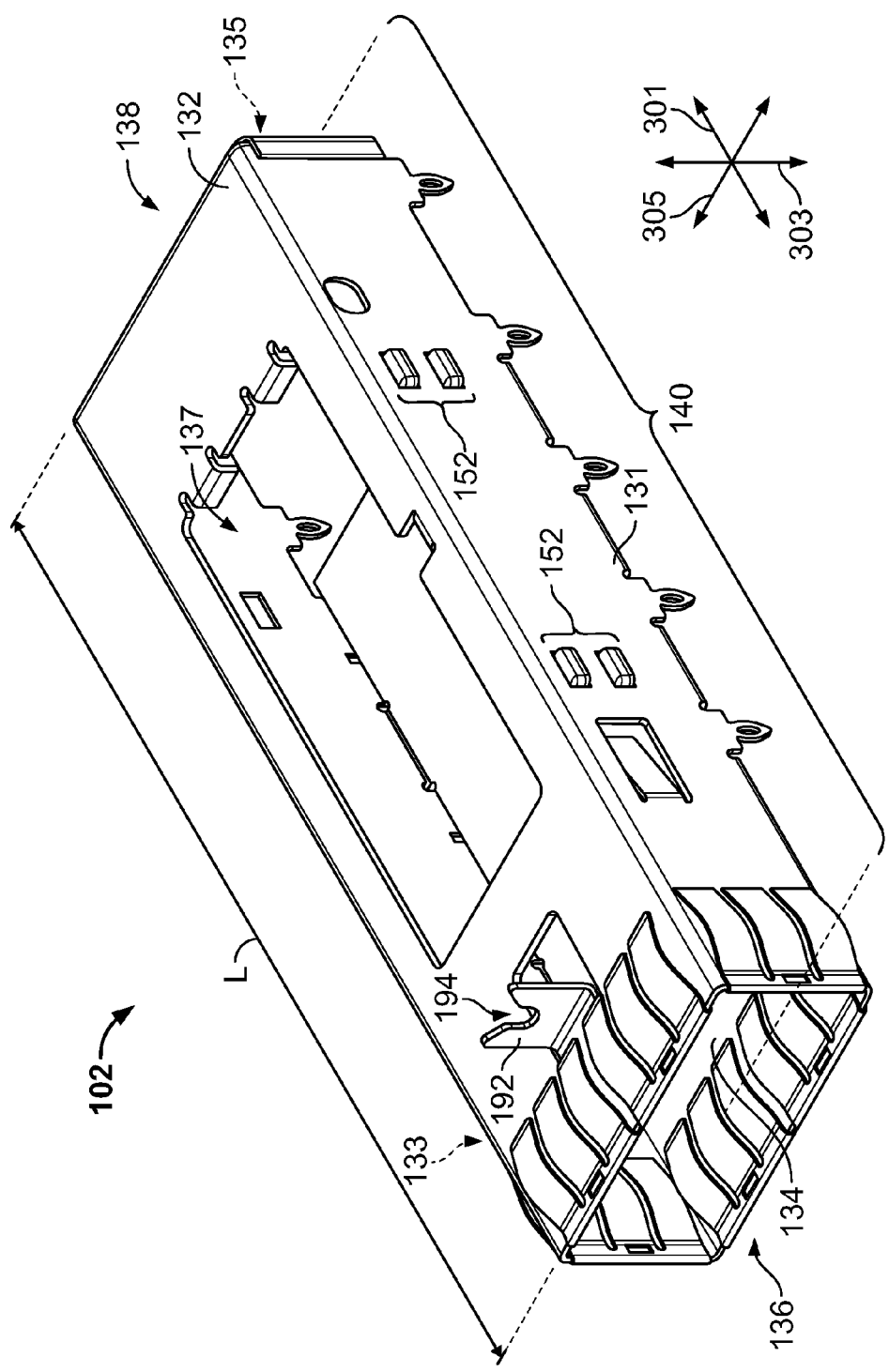
FIG. 2 is a perspective view of a guideframe that may be used with the receptacle assembly shown in FIG. 1.

FIG. 2 is a perspective view of the guideframe 102. The guideframe 102 may be formed from a plurality of panels 131-135 and include a front end 136, a back end 138, and passage 140 extending therebetween. The passage 140 extends in a longitudinal direction that is parallel to an axis 301. The guideframe 102 is configured to receive the electrical component 190 (FIG. 1) such that the electrical component 190 may be pluggably inserted into the passage 140 and connect with an electrical connector (not shown) positioned proximate to the back end 138. As shown, the guideframe 102 may have a rectangular shape formed by the plurality of panels 131-135 and be mounted to a circuit board 110 (FIG. 1) which may be coupled to the host system (not shown). The host system may be, for example, a computing system or a portable electrical device. The plurality of panels 131-135 include side panels 131-134 that extend in the longitudinal direction the length L of the guideframe 102. The plurality of panels 131-135 may also include a rear panel 135 that connects to or is positioned near the side panels 131-134 proximate to the back end 138. As shown in FIG. 2, the side panel 132 may include a passage opening 137 that allows a bottom portion 210 (FIG. 7) of the heat sink 104 (FIG. 1) to access the passage 140 and directly engage a surface of the electrical component 190 when the electrical component 190 is inserted into the receptacle assembly 100 (FIG. 1). The side panels 131 and 133 may include latch elements 152 that facilitate holding the bracket 106 (FIG. 1). In one embodiment, the plurality of panels 131-135 are stamped and formed from one piece of sheet metal and shaped to define the passage 140 therethrough. Alternatively, the guideframe 102 is constructed from separate components or parts.

Also shown in FIG. 2, the side panel 132 may include a support member 192 that extends therefrom in a substantially vertical direction. (The vertical direction is parallel to an axis 303.) The support member 192 is configured to hold the light pipe structure 108. The support member 192 may be stamped from the material of the side panel 132 and shaped to extend away therefrom or, alternatively, the support member 192 may be separately coupled to the side panel 132. The support member 192 may include an opening 194 configured to hold a portion or part of the light pipe structure 108 when the receptacle assembly 100 (FIG. 1) is assembled. As shown in FIG. 2, the support member 192 has a planar structure and may extend perpendicular to the side panel 132. As such, the opening 194 may be a cut-out that is oriented to receive a portion of the light pipe structure 108 extending in the longitudinal direction. Alternatively, the support member 192 may not have a planar structure, but may have, for example, a cylindrical body that couples to the side panel 132. As such, the opening 194 may be a cavity oriented to receive a portion of the light pipe structure 108 that extends downward in the vertical direction. Furthermore, the opening 194 may be a cut-out as shown in FIG. 2 or, alternatively, may be a thru-hole.

In another alternative embodiment, the support member 192 may have a planar structure that extends away from the side panel 132 as shown in FIG. 2, but may then bend and extend in the longitudinal direction such that the opening 194 may receive a portion of the light pipe structure 108 that extends in the vertical direction.

With reference again to FIG. 1, the heat sink 104 rests upon or is coupled to the side panel 132 (FIG. 2). The heat sink 104 has a surface 122 that may include a plurality of cooling projections 120 extending therefrom. The heat sink 104 is configured to absorb thermal energy generated by the electrical component 190 within the guideframe 102 and dissipate the thermal energy into the ambient air via the cooling projections 120. The receptacle assembly 100 may include the bracket 106, which is configured to restrain movement of the heat sink 104. More specifically, the bracket 106 may include opposing grips 144 (only one grip 144 is shown in FIG. 1) having arms 148 and 150 extending therebetween. The grips 144 have planar bodies configured to engage the corresponding side panels 133 and 131 (FIG. 2) and grip the latch elements 152 (FIG. 2) when the bracket 106 is mounted to the guideframe 102. The grips 144 and latch elements 152 may be configured to allows or tolerate slight movement or sliding of the grips 144 against the surfaces of the corresponding side panels. As shown in FIG. 1, the arms 148 and 150 extend from the grips 144 and are configured to contact or engage the surface 122 of the heat sink 104. The arms 148 and 150 may be biased to press against the surface 122 in a vertical direction toward the passage 140. The arms 148 and 150 may facilitate contact between the electrical component 190 and the side panel 132 and/or the heat sink 104 when the electrical component 190 is inserted into the receptacle assembly 100. As such, the arms 148 and 150 may be configured to flex and press against the surface 122 of the heat sink 104.

Also shown in FIG. 1, the cooling projections 120 have a cylindrical shape, however, a variety of shapes and configurations may be used. For example, the cooling projections 120 may have a fin-like shape or may be pipes that extend away and/or along the surface 122. In an alternative embodiment, the cooling projections 120 may be pipes that extend from the surface 122 and then bend and extend along or proximate to the surface. Also, the cooling projections 120 may be arranged in an array that substantially extends the length L (FIG. 2) of the guideframe 102. The array may be configured in rows or other predetermined positions that may facilitate dissipating the generated thermal energy. As will be discussed in more detail below, the light pipe structure 108 may include one or more light pipes 160 (FIG. 3) that are configured to extend between the cooling projections 120 proximate to the surface 122 of the heat sink 104. Thus, the array of cooling projections 120 may be configured to form a path for light pipe(s) 160 to extend therethrough. Alternatively, the light pipes 160 may be configured to extend above the cooling projections 120 thereby allowing a greater density of cooling projections 120 per unit area of the surface 122.

Figure 3:
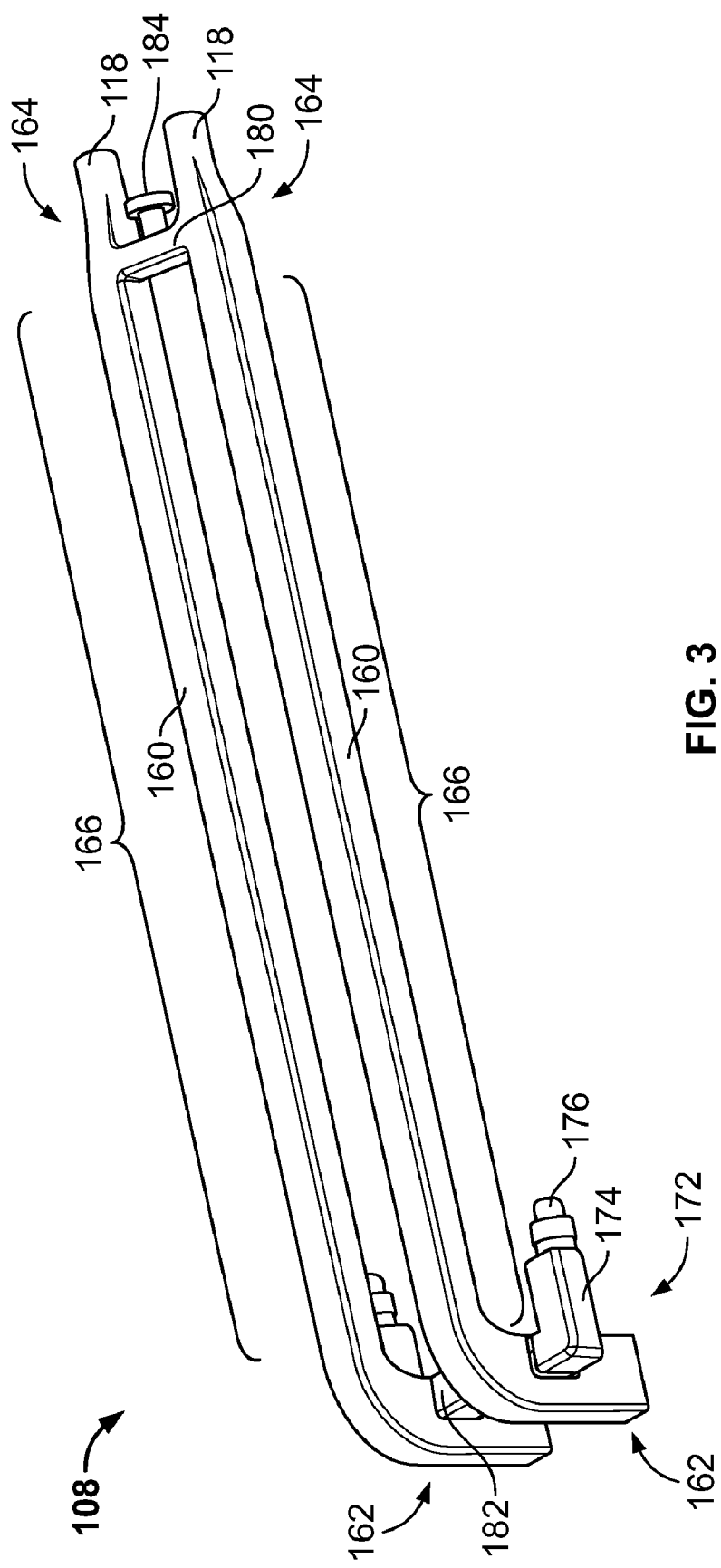
FIG. 3 is a perspective view of a light pipe structure that may be used with the receptacle assembly shown in FIG. 1.

FIG. 3 is a perspective view of the light pipe structure 108, which includes a pair of light pipes 160. The light pipes 160 are configured to convey the status indication from indicators 170 (FIG. 4) to the bezel 112 (FIG. 1) for displaying or illuminating the light outside of the host system (not shown). As shown in FIG. 3, each light pipe 160 includes a rearward end portion 162, a forward end portion 164, and a pipe body 166 that extends therebetween. Each pipe body 166 may extend longitudinally in a linear manner or, alternatively, may curve or turn as the light pipe 160 extends in the longitudinal direction. Also shown, each end portion 162 may include a coupling member 172 for engaging the rear panel 135 (FIG. 2). In FIG. 3 the coupling member 172 includes a base 174 that extends from the end portion 162 and a protrusion 176 extending therefrom. The base 174 and the protrusion 176 may extend from the end portion 162 in the longitudinal direction and substantially parallel to the pipe body 166. In alternative embodiments, the base 174 and the protrusion 176 may extend from the pipe body 166 that is proximate to the end portion 162 in a direction that is substantially perpendicular to the pipe body 166 (i.e., in a substantially vertical direction). Furthermore, although FIG. 3 only illustrates one coupling member 172 extending from each light pipe 160, more than one coupling member 172 may be used for each light pipe 160.

The end portions 164 each include the pipe end 118 and are configured to be inserted into or through the bezel 112 (FIG. 1). More specifically, the cross-sectional shape of the end portion 164 may conform into the opening 116 (FIG. 1) of the bezel 112. As shown in FIG. 3, the light pipe structure 108 may include multiple light pipes 160 that extend substantially parallel to each other and are coupled together at or near the end portions 164 by a front bridge 180 and at or near the end portions 162 by a base bridge 182. The front and base bridges 180 and 182, respectively, may be configured to facilitate stabilizing the light pipes 160 and maintaining the end portions 164, 162 in the proper position when the receptacle assembly 100 (FIG. 1) is in use. Also shown in FIG. 3, the front bridge 180 may include a post 184 projecting outward in an axial direction. The post 184 is configured to engage the support member 192 (FIG. 2) of the guideframe 102 (FIG. 2) when the light pipe structure 108 is coupled to the guideframe 102. Alternatively, the post 184 may project perpendicular to the longitudinal direction and engage the support member 192. In another alternative embodiment, the light pipe structure 108 does not include the post 184 but another coupling member 172 that directly engages the support member 192 or the side panel 132 (FIG. 2).

Figure 4:
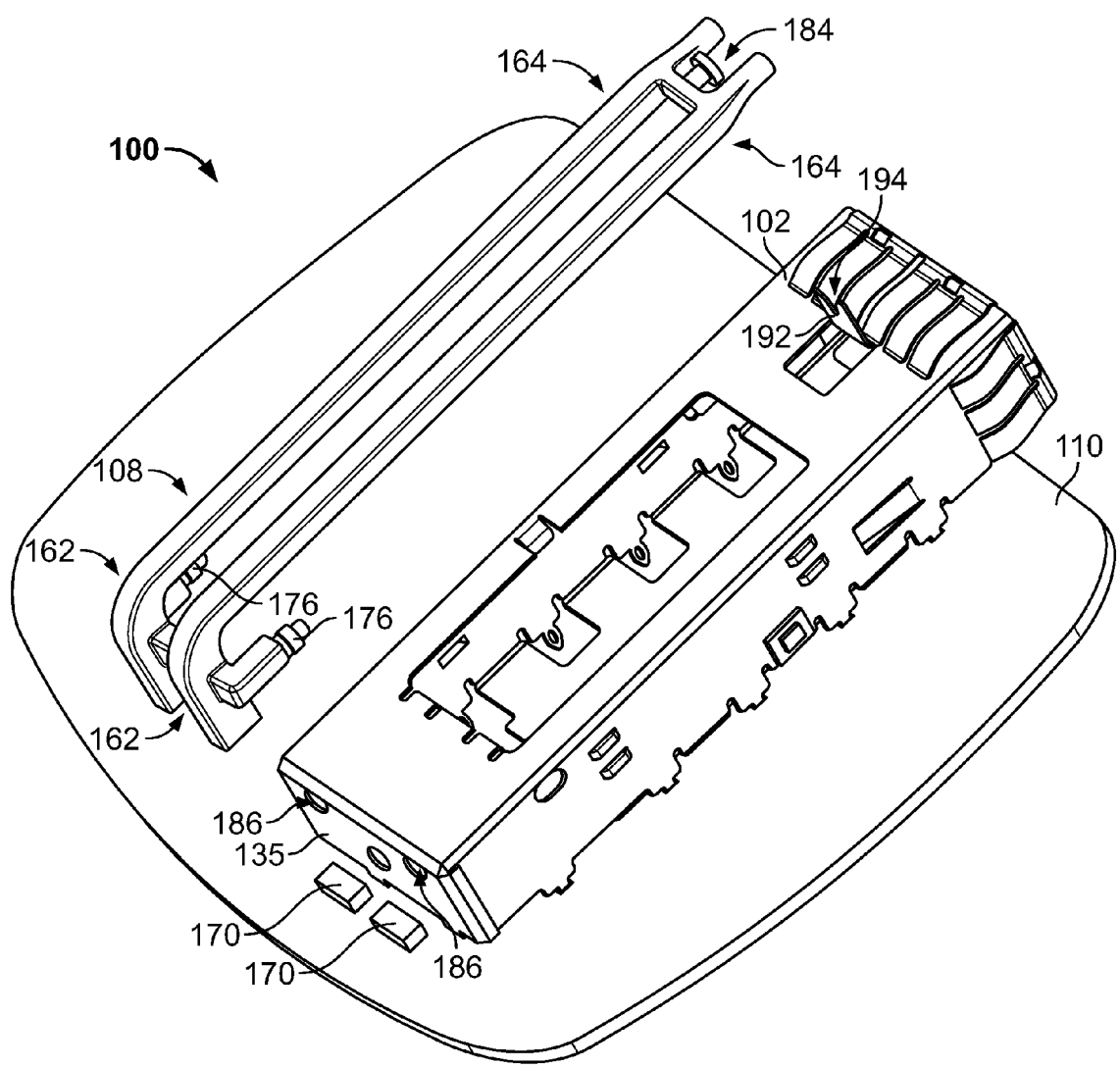
FIG. 4 is a rear perspective view of the receptacle assembly shown in FIG. 1 before the light pipe structure engages the guideframe.
Figure 5:
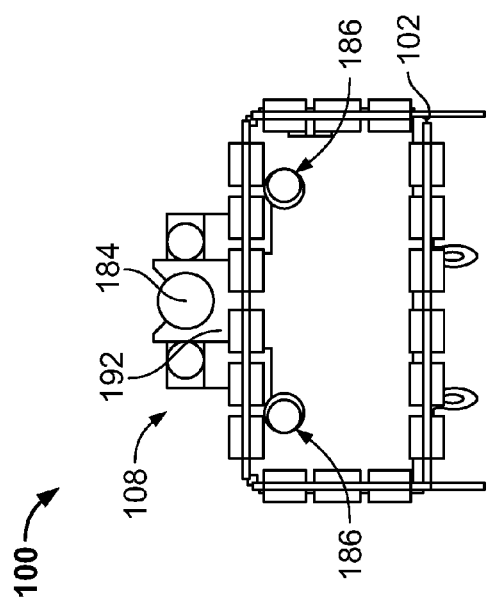
FIG. 5 is a front planar view of the receptacle assembly shown in FIG. 1.
Figure 6:
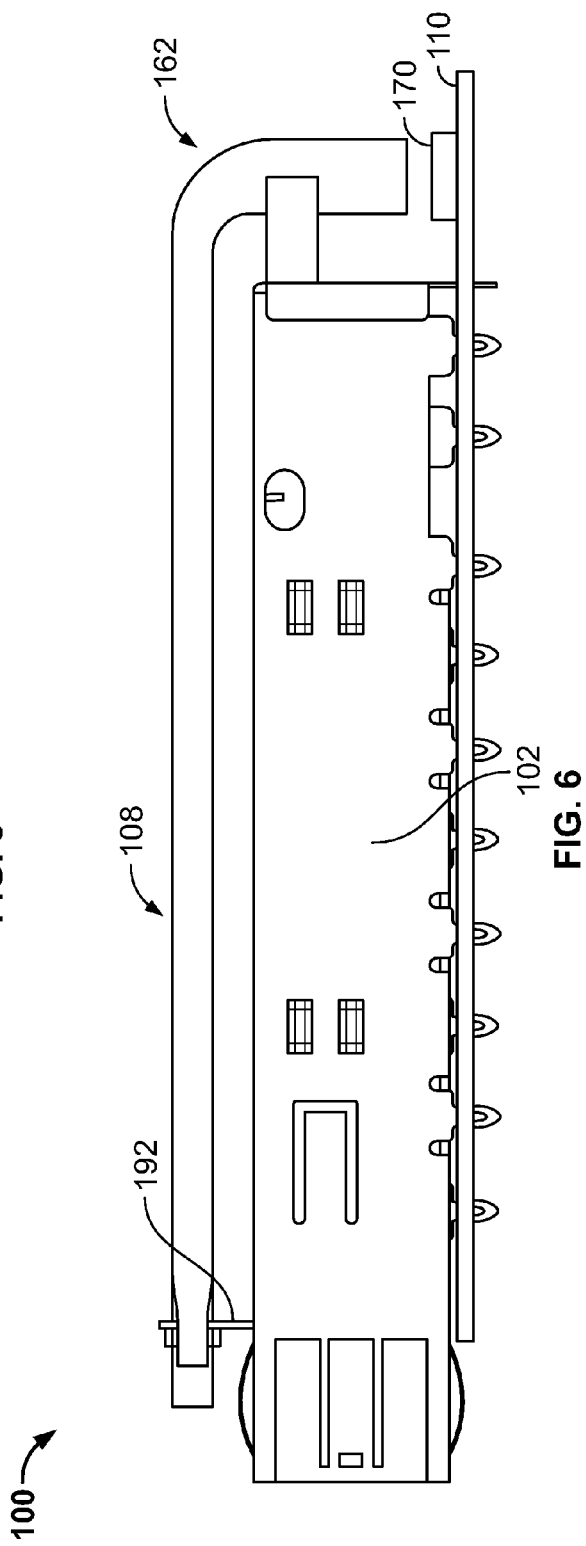
FIG. 6 is a side view of the receptacle assembly shown in FIG. 1.

FIG. 4 is a rear perspective view of the receptacle assembly 100 before the light pipe structure 108 engages the guideframe 102. FIGS. 5 and 6 illustrate the receptacle assembly 100 from a front planar view and a side planar view, respectively, after the light pipe structure 108 has engaged the guideframe 102. For illustrative purposes, the heat sink 104 and bracket 106 have been removed. (As discussed above, the receptacle assembly 100 may optionally include the heat sink 104 and the bracket 106.) With reference to FIG. 4, the rear panel 135 may include rear holes 186 that are configured to engage the protrusions 176. To mount the end portions 162 of the light pipe structure 108 onto the guideframe 102, the protrusions 176 are inserted into the rear holes 186 of the rear panel 135. The protrusions 176 may press-fit into the rear holes 186. Alternatively, the protrusions 176 may have a surrounding band of compressive material that compresses when the protrusions 176 are pushed through the rear holes. To mount the end portions 164 of the light pipe structure 108 onto the guideframe 102, the post 184 may be lowered into the opening 194 of the support member 192 such that the post 184 rests within the opening 194. In alternative embodiments, the post 184 may press-fit into the opening 194 or, if the opening 194 is a thru-hole, the post 184 may be inserted through the hole in a similar manner as the protrusions 176 are inserted through the rear holes 186. In yet another alternative embodiment, the guideframe 102 does not include a support member 192 and the end portion 164 is entirely supported by the bezel 112.

With reference to both FIGS. 5 and 6, when the light pipe structure 108 is fully engaged with the guideframe 102 the end portions 162 (FIG. 6) are positioned to capture status indications from indicators 170 (FIG. 6). In one embodiment, the status indicators 170 may be one or more light emitting diodes (LED's). Also shown, the light pipe structure 108 may be solely supported by the guideframe 102 at multiple points of contact. More specifically, the light pipe structure 108 is supported by the support member 192 and the rear holes 186 (FIG. 5). As discussed above, for embodiments of the receptacle assembly 100 that do not include the heat sink 104, the bracket 106 is not required to be used. However, in alternative embodiments, the bracket 106 may also be used and may facilitate supporting the light pipe structure 108.

Figure 7:
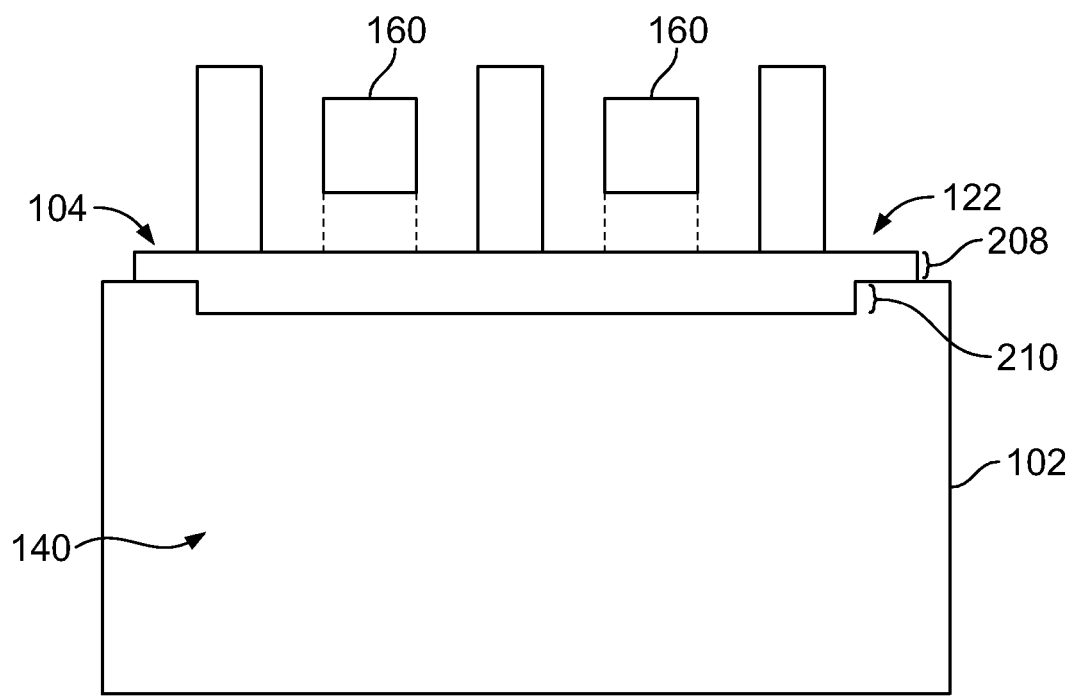
FIG. 7 is a cross-sectional view of the receptacle assembly taken along the line 7-7 shown in FIG. 1.
Figure 8:
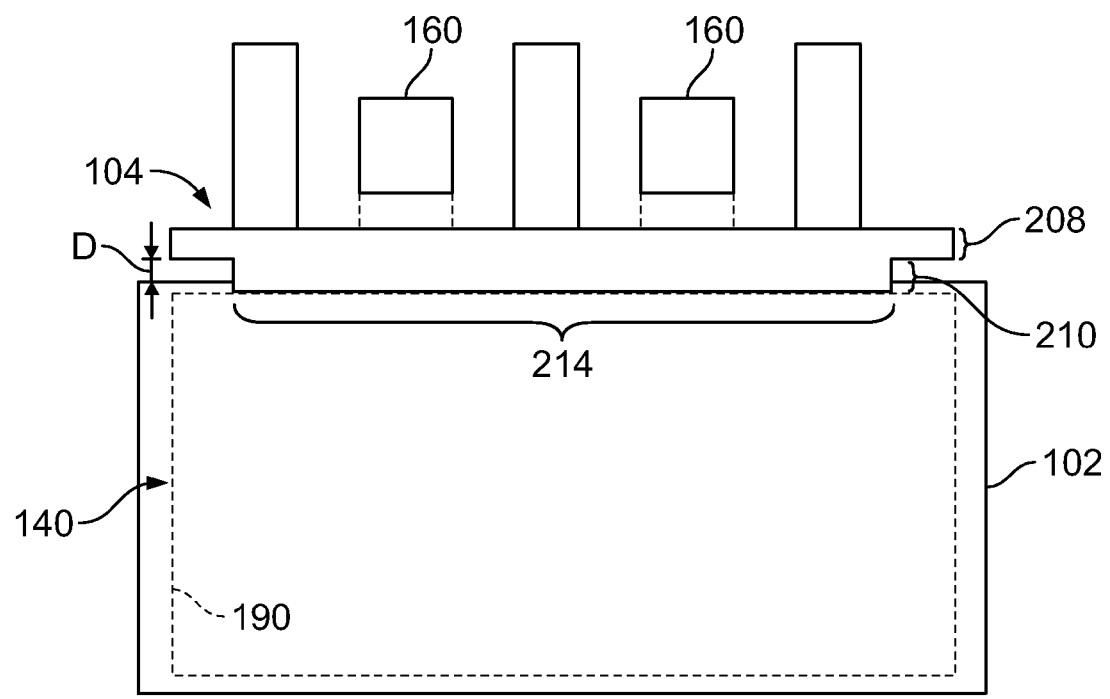
FIG. 8 is a cross-sectional view of the receptacle assembly shown in FIG. 7 after an electrical component has been inserted into the receptacle assembly.

FIG. 7 is a cross-sectional view of the receptacle assembly 100 taken along the line 7-7 shown in FIG. 1, and FIG. 8 is a cross-sectional view of the receptacle assembly 100 after the electrical component 190 has been inserted into the receptacle assembly 100. (For illustrative purposes, the electrical connector and the bracket 106 (FIG. 1) are not shown in FIGS. 7 and 8). As shown, the heat sink 104 may include a main body 208 and a bottom portion 210 that extends from the main body 208. When the heat sink 104 is coupled to the guideframe 102, the bottom portion 210 may extend through the opening 137 (FIG. 2) of side panel 132 and into the passage 140. When the electrical component 190 (FIG. 8) is inserted into the passage 140, the bottom portion 210 extending into the passage 140 may engage or press against a surface of the electrical component 190 along a thermal interface 214. As shown in FIG. 7, the heat sink 104 is in an unengaged or home position. In the home position, the arms 148 and 150 of the bracket 106 (all shown in FIG. 1) are pushing against the surface 122 in a substantially downward vertical direction. When the electrical component 190 engages the bottom portion 210, the heat sink 104 may move a small distance D from the home position to an engaged position shown in FIG. 8. The arms 148 and 150 flex with the movement of the heat sink 104 but maintain the force against the surface 122 thereby facilitating the contact between the heat sink 104 and the electrical component 190 along the thermal interface 214.

However, as shown in FIGS. 7 and 8, the light pipe structure 108 (FIG. 3) and the light pipes 160 do not move with the heat sink 104. As such, the heat sink 104 and the light pipe structure 108 are independently coupled to the guideframe 102. The end portion 162 (FIG. 3) remains positioned to capture light signals from indicators 170 (FIG. 6). Furthermore, because the light pipes 160 do not move with the heat sink 104, the pipe bodies 166 are not forced to bend to accommodate for the movement.

Figure 9:
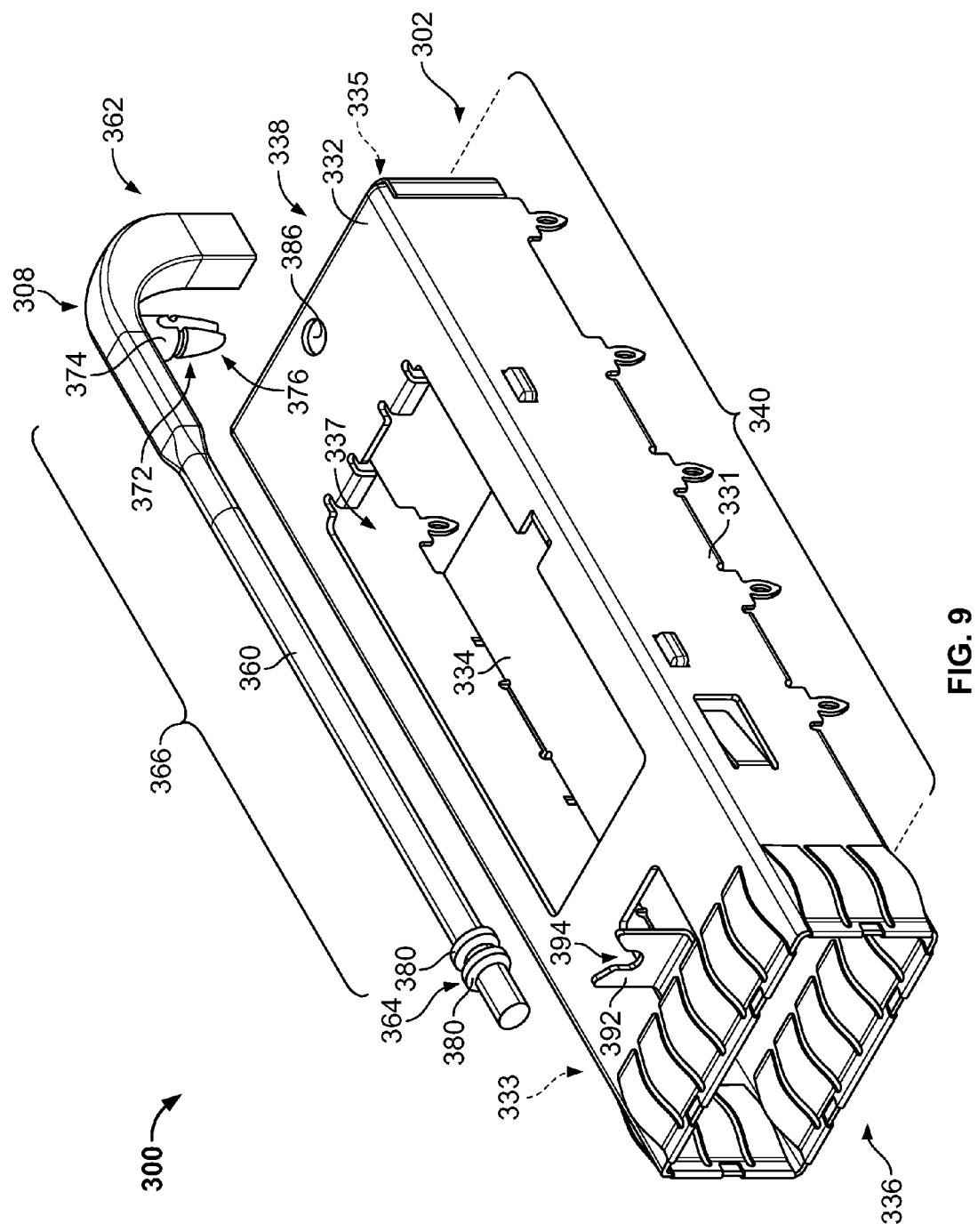
FIG. 9 is an exploded perspective view of a receptacle assembly formed in accordance with another embodiment.

FIG. 9 is a perspective view of a receptacle assembly 300 formed in accordance with an alternative embodiment. The receptacle assembly 300 may include a light pipe structure 308 and a guideframe 302. FIG. 9 illustrates a light pipe structure 308 and a guideframe 302 before being combined to form the receptacle assembly 300. The guideframe 302 may have similar components and structure as the guideframe 102. More specifically, the guideframe 302 may be formed from a plurality of panels 331-335 including side panels 331-334 and a rear panel 335. The guideframe 302 is formed from the plurality of panels 331-335 and includes a front end 336, a back end 338, and passage 340 extending therebetween. The side panel 332 includes an opening 337 for optionally receiving a portion of a heat sink (not shown). The side panel 332 also includes a support member 392 extending therefrom that includes an opening 394. The support member 392 and the opening 394 may have similar features as described above with respect to the support member 192 and the opening 194. However, as will be discussed below, the opening 394 is configured to receive a pipe body 366 of the light pipe structure 308. Also shown, the guideframe 302 may include a hole 386 that extends through the side panel 332. The hole 386 may be positioned toward the back end 338 of the guideframe 302. Alternatively, the hole 386 may be positioned closer to the passage opening 337 or proximate to an edge that joins the side panel 332 to one of the side panels 331 and 333.

The light pipe structure 308 includes a light pipe 360 having a rearward end portion 362, a front end portion 364, and the pipe body 366 extending therebetween. The light pipe structure 308 also includes a coupling member 372 extending from or proximate to the end portion 362. The coupling member 372 may extend in a vertical direction downward toward the passage 340. The coupling member 372 may include a base 374 extending from the light pipe 360 and a protrusion 376 extending from the base 374. The protrusion 376 is configured to be inserted into the hole 386 and may include two opposing flex members that may be compressed toward each other when the flex members engage edges of the hole 386. The coupling member 372 may also have a channel extending along the perimeter of the coupling member in which the edges of the hole 386 may be inserted into. Alternatively, the coupling member 372 may have similar features as described with respect to the coupling member 172.

Also shown in FIG. 9, the light pipe 360 may include a pair of bands 380 that are separated a predetermined distance. The bands 380 are configured to engage the support member 392 when the light pipe structure 308 is mounted onto the guideframe 302. Although FIG. 9 illustrates two bands 380, only one band 380 may be used to engage one side of the support member 392. Furthermore, in alternative embodiments, if more than one support member 392 is used, a plurality of bands 380 may be used to engage the support members 392.

It is to be understood that the above description is intended to be illustrative, and not restrictive. As such, the above-described embodiments (and/or aspects thereof) may be used in combination with each other. In addition, many modifications may be made to adapt a particular situation or material to the teachings of the invention without departing from its scope. For example, the guideframes 102 and 302 may have more than one support member 192 and 392, respectively, for separately supporting the light pipes 160 and 360, respectively.

Dimensions, types of materials, orientations of the various components, and the number and positions of the various components described herein are intended to define parameters of certain embodiments, and are by no means limiting and are merely exemplary embodiments. For example, although the light pipe structures 108 and 308 include substantially linear pipe bodies 166 and 366, respectively, the light pipes 160 and 360 may curve or turn as the light pipes 160 and 360 extend alongside the corresponding side panel. Furthermore, the light pipes 160 in the light pipe structure 108 may curve or turn toward or away from each other as the light pipes 160 extend alongside the side panel 132.

Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

What is claimed is:

1. A receptacle assembly coupled to a host system and configured to receive an electrical component, the receptacle assembly comprising:
   a guideframe having a front end, a back end, and a passage extending therebetween and configured to receive the electrical component, the guideframe comprising a plurality of panels that define the passage including a rear panel proximate to the back end and a side panel having a support member extending therefrom; and
   a light pipe structure including a light pipe extending alongside the guideframe between the front end to the back end, the light pipe including a rearward end portion configured to receive a status indication from the host system, wherein the light pipe structure is directly engaged to the support member and the rearward end portion is directly coupled to at least one of the side panel and the rear panel.

2. The receptacle assembly in accordance with claim 1 wherein the at least one of the side panel and the rear panel includes a hole leading into the passage and the light pipe structure includes a coupling member having a protrusion, the protrusion configured to be inserted through the hole to directly engage the guideframe to the light pipe structure.

3. The receptacle assembly in accordance with claim 1 wherein the side panel extends longitudinally along the passage and the rear panel is oriented perpendicular to the side panel, the light pipe structure being directly coupled to the rear panel.

4. The receptacle assembly in accordance with claim 1 wherein the light pipe structure is solely supported by the guideframe.

5. The receptacle assembly in accordance with claim 1 wherein the guideframe is substantially rectangular.

6. The receptacle assembly in accordance with claim 1 wherein the guideframe is stamped and formed from sheet metal.

7. The receptacle assembly in accordance with claim 1 wherein the light pipe structure includes a plurality of light pipes extending alongside a common side of the guideframe.

8. The receptacle assembly in accordance with claim 1 wherein the light pipe is a first light pipe, the light pipe structure including a second light pipe that extends along the first light pipe and a bridge that couples the first and second light pipes, the bridge engaging the support member for supporting the light pipe structure.

9. The receptacle assembly in accordance with claim 1 wherein the support member is stamped and formed from the side panel.

10. The receptacle assembly in accordance with claim 1 wherein the light pipe further comprises a front end portion, the light pipe extending from the rearward end portion to the front end portion, wherein both the front end portion and the rearward end portion are directly engaged to and supported by the guideframe.

11. The receptacle assembly in accordance with claim 1 wherein the light pipe is a first light pipe, the light pipe structure further comprising a second light pipe that extends alongside the guideframe and a bridge joining the first and second light pipes, wherein the bridge engages the support member for supporting the light pipe structure.

12. A receptacle assembly coupled to a host system and configured to receive an electrical component, the receptacle assembly comprising:
a guideframe having a front end, a back end, and a passage extending therebetween and configured to receive the electrical component, the guideframe comprising a plurality of panels that define the passage including a rear panel proximate to the back end and a side panel having a support member extending therefrom;
a heat sink coupled to the guideframe and configured to absorb thermal energy generated within the guideframe; and
a light pipe structure including a light pipe extending alongside the guideframe between the front end to the back end, the light pipe including a rearward end portion configured to receive a status indication from the host system, wherein the light pipe structure is directly engaged to the support member and the rearward end portion is directly coupled to at least one of the side panel and the rear panel.

13. The receptacle assembly in accordance with claim 12 wherein the at least one of the side panel and the rear panel includes a hole leading into the passage and the light pipe structure includes a coupling member having a protrusion, the protrusion configured to be inserted through the hole to directly engage the guideframe to the light pipe structure.

14. The receptacle assembly in accordance with claim 12 wherein the side panel extends longitudinally along the passage and the rear panel is oriented perpendicular to the side panel, the light pipe structure being directly coupled to the rear panel.

15. The receptacle assembly in accordance with claim 12 wherein the light pipe is solely supported by the guideframe.

16. The receptacle assembly in accordance with claim 12 wherein the heat sink includes a surface having a plurality of cooling projections extending therefrom, the cooling projections arranged to allow the light pipe to extend between the cooling projections proximate to the surface.

17. The receptacle assembly in accordance with claim 12 wherein the guideframe includes a passage opening and the heat sink includes a bottom portion configured to extend into the passage through the passage opening, the bottom portion configured to engage the electrical component when the electrical component is inserted into the guideframe.

18. The receptacle assembly in accordance with claim 17 wherein the heat sink moves from a home position to an engaged position when the electrical component is inserted into the passage of the guideframe.

19. The receptacle assembly in accordance with claim 12 further comprising a bracket configured to grip the guideframe and to hold the heat sink against the guideframe, wherein the bracket does not support the light pipe structure.

20. The receptacle assembly in accordance with claim 12 wherein the heat sink is configured to engage the electrical component and move from a home position to an engaged position when the electrical component is inserted into the passage of the guideframe, the light pipe structure remaining in position alongside the guideframe.

* * * * *